(12) United States Patent
Fellers et al.

(10) Patent No.: US 6,370,009 B1
(45) Date of Patent: Apr. 9, 2002

(54) INTERNALLY-FUSED CAPACITOR

(75) Inventors: Clay L. Fellers, Little Mountain; David W. Anderson, Greenwood, both of SC (US); Marco J. Mason, Racine, WI (US)

(73) Assignee: McGraw-Edison Company, Houston, TX (US)

( * ) Notice: Subject to any disclaimer, the term of this patent is extended or adjusted under 35 U.S.C. 154(b) by 0 days.

(21) Appl. No.: 09/326,643

(22) Filed: Jun. 7, 1999

(51) Int. Cl.⁷ .................................................. H01G 4/00
(52) U.S. Cl. .................... 361/301.3; 361/302; 361/303; 361/306.1; 361/311; 361/277; 439/291; 439/292
(58) Field of Search .......................... 361/275, 15, 328, 361/303, 306.1, 301.3, 311, 308, 310, 302; 439/291

(56) References Cited

U.S. PATENT DOCUMENTS

| 550,638 A | 12/1895 | McCullouch |
| 3,579,061 A | 5/1971 | Waldon |
| 4,186,417 A | 1/1980 | Grahame .................... 361/15 |
| 4,442,473 A * | 4/1984 | Holtzman et al. .......... 361/275 |
| 4,447,852 A | 5/1984 | Clement |
| 4,633,369 A * | 12/1986 | Lapp et al. ................. 361/328 |
| 4,636,765 A * | 1/1987 | Krueger ...................... 337/273 |
| 5,485,137 A * | 1/1996 | Maléus et al. .............. 337/295 |
| 5,486,653 A * | 1/1996 | Dohi ........................... 174/84 |
| 5,594,616 A * | 1/1997 | Brecht et al. ............... 361/622 |
| 5,680,290 A | 10/1997 | Akai et al. |
| 5,941,722 A * | 8/1999 | Chen et al. ................. 439/291 |
| 6,191,931 B1 * | 2/2001 | Paspa et al. ................ 361/302 |

FOREIGN PATENT DOCUMENTS

| GB | 0 754 532 | 8/1956 |
| GB | 0 788 391 | 1/1958 |
| GB | 0 806 117 | 12/1958 |
| GB | 1 275 861 | 5/1972 |
| GB | 1 286 680 | 8/1972 |
| GB | 1 447 982 | 9/1976 |
| GB | 2 038 095 | 7/1980 |

* cited by examiner

*Primary Examiner*—Dean A. Reichard
*Assistant Examiner*—Nguyen T Ha
(74) *Attorney, Agent, or Firm*—Fish & Richardson P.C.

(57) ABSTRACT

An internally-fused capacitor includes a capacitor housing, at least one capacitor module, and at least one fuse assembly. The capacitor module is positioned in the housing and includes capacitor elements. Each capacitor element includes a first extended foil edge on a first end and a second extended foil edge on a second end. The fuse assembly is positioned in the housing and includes a fuse wire. The fuse wire is connected at a first end of the fuse wire to the first extended foil edge by a crimped connection.

30 Claims, 7 Drawing Sheets

INTERNALLY-FUSED CAPACITOR

TECHNICAL FIELD

The invention relates to an internally-fused capacitor.

BACKGROUND

An internally-fused capacitor includes one or more fuses within a capacitor housing. The fuses protect capacitor elements from overcurrent conditions that may result in the release of expanding gases that could damage the housing and the capacitor elements. A typical fuse assembly employs a small conductive wire that disintegrates in response to excessive electrical current. The fuse may be confined between kraft paper, or boards, which are inserted between the capacitor elements. Typically, one end of the fuse is soldered to a metal conducting foil edge of a capacitor element and the other end of the fuse is soldered to a metal collector bus.

When a capacitor element fails, the element creates a short circuit through which energy stored in capacitor elements connected in parallel with the failed capacitor element may discharge. The fuse disintegrates in response to the excessive current resulting from this discharge, which breaks the electrical connection between the failed element and the collector bus. With the failed element thus removed from the circuit, the capacitor can continue to operate using the remaining elements until enough elements fail to cause overvoltage or unbalance conditions that exceed set protective levels.

SUMMARY

In one general aspect, an internally-fused capacitor includes a capacitor housing, at least one capacitor module, and at least one fuse assembly. The capacitor module is positioned in the housing and includes capacitor elements. Each capacitor element includes a first extended foil edge on a first end and a second extended foil edge on a second end. The fuse assembly is positioned in the housing and includes a fuse wire adjacent to the capacitor element. The fuse wire is connected at a first end of the fuse wire to the first extended foil edge by a crimped connection.

Embodiments may include one or more of the following. For example, the internally-fused capacitor may further include at least one fuse card positioned in the housing and including a base with barriers protruding from the base and defining channels. Fuse assemblies are positioned in the channels.

The crimped connection may include a mechanical crimp between a crimp plate and the fuse wire at the first extended foil edge. The crimp plate has a pair of faces that may be compressed against the first extended foil edge. The crimp plate may include a barrel connector with the fuse wire crimped in the barrel connector.

The fuse wire may be enclosed along a portion of its length in a fuse tube which may serve to help extinguish the arc created by the disintegration of the wire. The fuse tube also may absorb breakdown energy and direct breakdown products away from the capacitor elements.

The internally-fused capacitor may further include a terminal extending from the housing and a terminal wire connected between the terminal and a second extended foil edge of a capacitor element by a crimped connection.

The internally-fused capacitor may further include a second capacitor module and fuse assemblies positioned in the housing. The second capacitor module includes capacitor elements, each of which includes first and second extended foil edges. Each fuse wire is connected at a first end to the first extended foil edge by a crimped connection. The internally-fused capacitor may further include first and second fuse cards, each of which includes a base with barriers protruding from the base and defining channels. Each fuse assembly is disposed within one channel. The internally-fused capacitor may further include a jumper lead connected at a first end to a first fuse wire node of the first capacitor module and at a second end to a second extended foil edge of the second capacitor module.

The internally-fused capacitor may further include a jumper lead connected at a first end to a first fuse wire node of the first capacitor module and at a second end to a second fuse wire node of the second capacitor module. The first fuse wire node includes an electrical connection through fuses to the first extended foil edges of the capacitor elements of the first capacitor module. The second fuse wire node includes an electrical connection through fuses to the second extended foil edges of the capacitor elements of the second capacitor module.

The fuse cards include a dielectric insulating material, such as polypropylene. The fuse tube may be made of an insulating material, such as silicone rubber.

The internally-fused capacitor offers considerable advantages. For example, conventional internally-fused capacitors confine the fuse between dielectric kraft paper separating energized elements. The paper is easily damaged by the mechanical forces created when an element fails. As a consequence, a capacitor element failure may damage a neighboring fuse that protects an adjacent, and functioning, capacitor element. This can result in the premature removal of a sound element. This also can allow energization of a previously-isolated failed element, which can lead to a capacitor failure that ruptures the capacitor housing. Placing the fuses in individual tubes and placing the tubes in channels in a fuse card help to ensure that operation of a fuse will not affect adjacent elements.

The internally-fused capacitor also prevents the generation of excessive gas and residue associated with a fuse disintegrating adjacent to kraft paper, which can contaminate insulating materials and dielectric fluid in the capacitor housing. If the gas and residue are absorbed and redistributed through the remaining sound sections of the capacitor, such as, for example, in the dielectric fluid, the integrity of the remaining elements may be jeopardized.

In particular, using a crimping operation instead of conventional soldering operations protects dielectric materials made from polymers, such as polypropylene, which may be damaged by the heat generated during soldering. Crimping also offers the considerable advantage of providing a joint that may be easily inspected for quality assurance purposes. By providing repeatable, high quality crimp joints, electrical loss through the joints may be reduced, which provides cost savings to the user. In addition, by reducing the electrical loss through the joints, associated resistive heating is reduced to thereby reduce damaging heat effects on the internal structure of the capacitor.

Other features and advantages will be apparent from the following description, including the drawings, and from the claims.

DESCRIPTION

Figure 1:
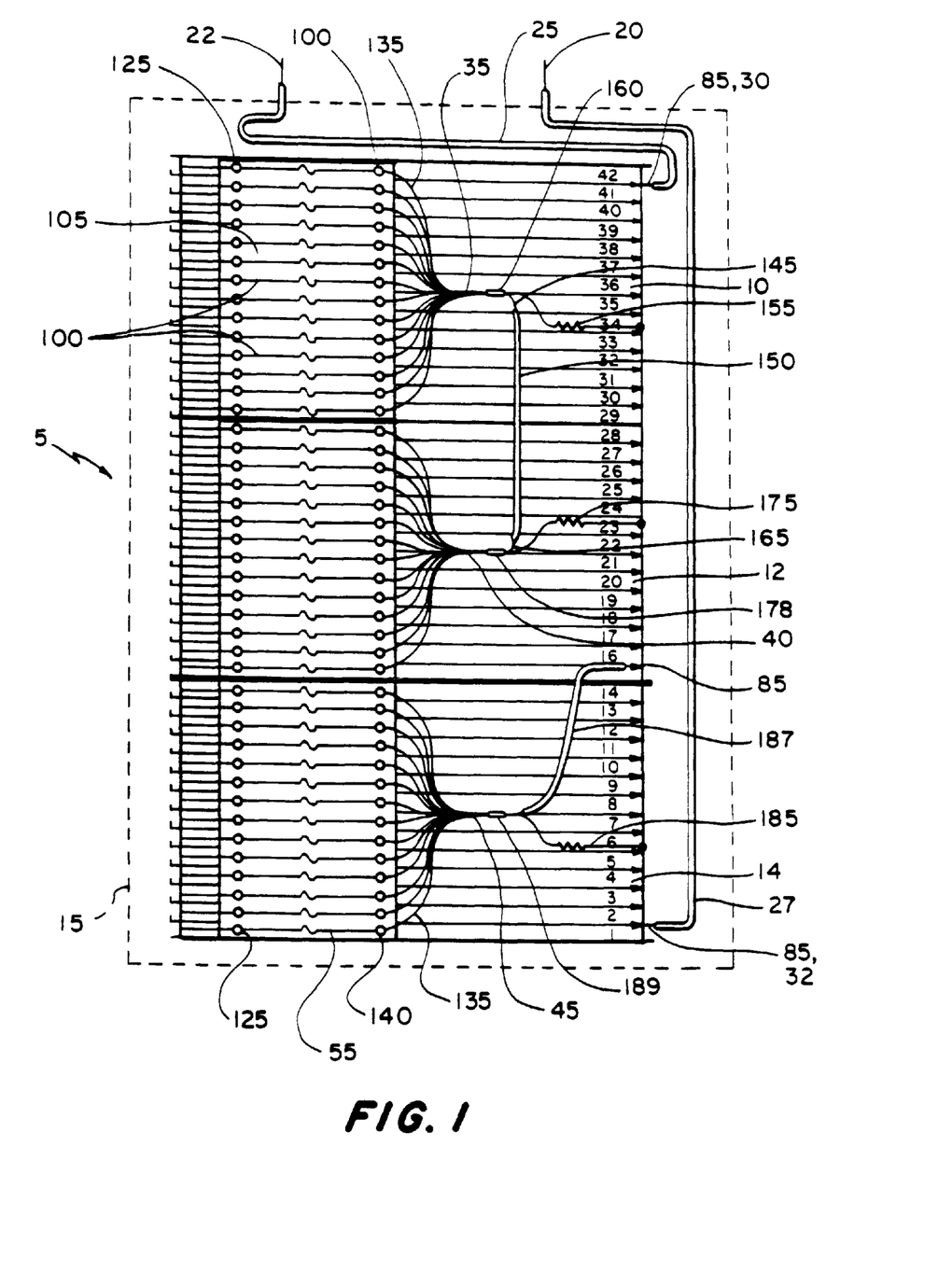
FIG. 1 is a schematic representation of an internally-fused capacitor.

Referring to FIG. 1, an internally-fused capacitor 5 may include three capacitor modules 10, 12, 14 within a capacitor housing 15. A pair of terminals 20, 22 are electrically connected to the capacitor modules 10, 12, 14 by terminal wires 25, 27 connected to terminal nodes 30, 32, respectively. In particular, terminal 22 is connected by terminal wire 25 to terminal node 30 at a first end of capacitor module 10, while terminal 20 is connected by terminal wire 27 to terminal node 32 at a first end of capacitor module 14. A discharge resister (not shown) may also be connected between terminal wires 25 and 27. A second end of capacitor module 10 is a first fuse wire common node 35, which is connected to a second fuse wire common node 40 at a second end of capacitor module 12. A first end of capacitor module 12 is connected to a third fuse wire common node 45 at a second end of capacitor module 14. Capacitor housing 15 is filled with a dielectric fluid that surrounds the capacitor modules 10, 12 14.

Figure 2:
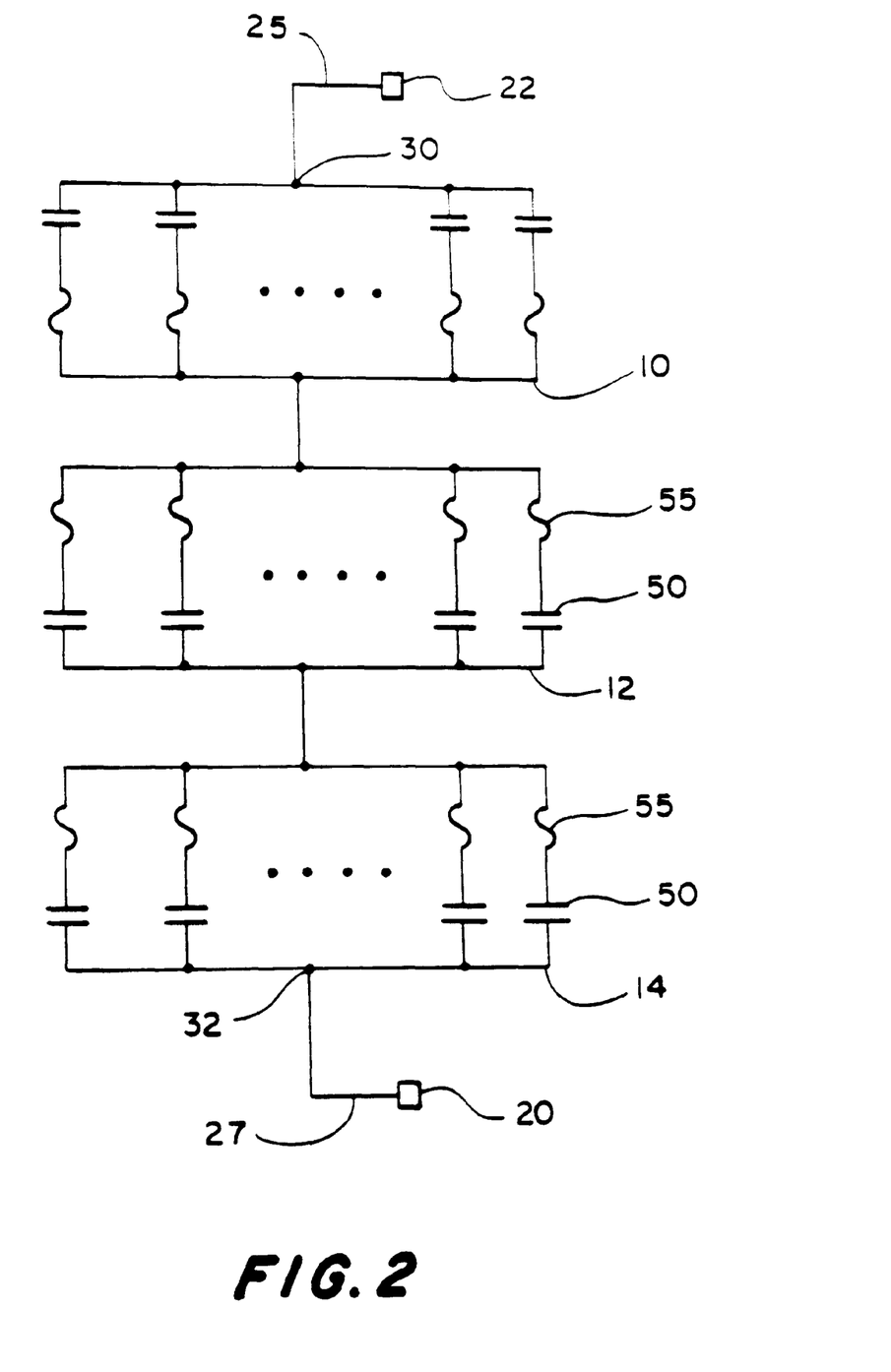
FIG. 2 is a circuit diagram of the internally-fused capacitor of FIG. 1.

Referring also to FIG. 2, each of capacitor modules 10, 12, and 14 includes multiple capacitor elements 50 connected in series with corresponding fuses 55 and in parallel with other capacitor elements 50 and their corresponding fuses 55. As shown, the capacitor modules 10, 12, 14 are arranged in series.

The fuses 55 are thin electrically conductive wires which disintegrate in response to an excessive current. For example, if a capacitor element 50 fails and creates a short circuit, energy stored in other capacitor elements 50 connected in parallel with the failed capacitor element discharges through the short circuit, causing an excessive current. The excessive current passing through the fuse 55 causes it to disintegrate, which breaks the electrical connection to the failed capacitor element. The broken electrical connection removes the failed element from the circuit so that the capacitor can continue to operate using the remaining elements until enough elements fail to cause overvoltage or unbalance conditions that exceed set protective levels.

Figure 3:
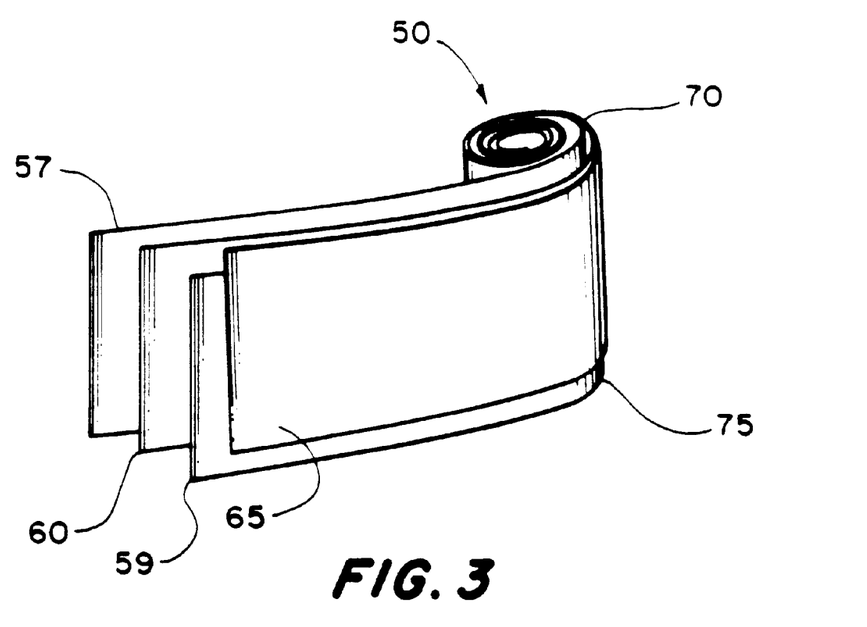
FIG. 3 is a perspective view of a capacitor element.

Referring to FIG. 3, a capacitor element 50 may be formed by winding two conductive foil sheets 57, and two insulating layers 60, 65 formed, for example, from polypropylene film. Conductive foil sheets 57 and 59 are laterally offset and separated by first insulating layer 60. As a result, when the capacitor element 50 is wound, conductive foil sheet 57 will extend from a first end 70 and conductive foil sheet 59 will extend from a second end 75.

The second insulating layer 65 is placed against the second conductive foil sheet 59 on the surface opposite the surface against which first insulating layer 65 is placed. In this manner the conductive foil sheets 57 and 59 are electrically isolated from each other.

Figure 4:
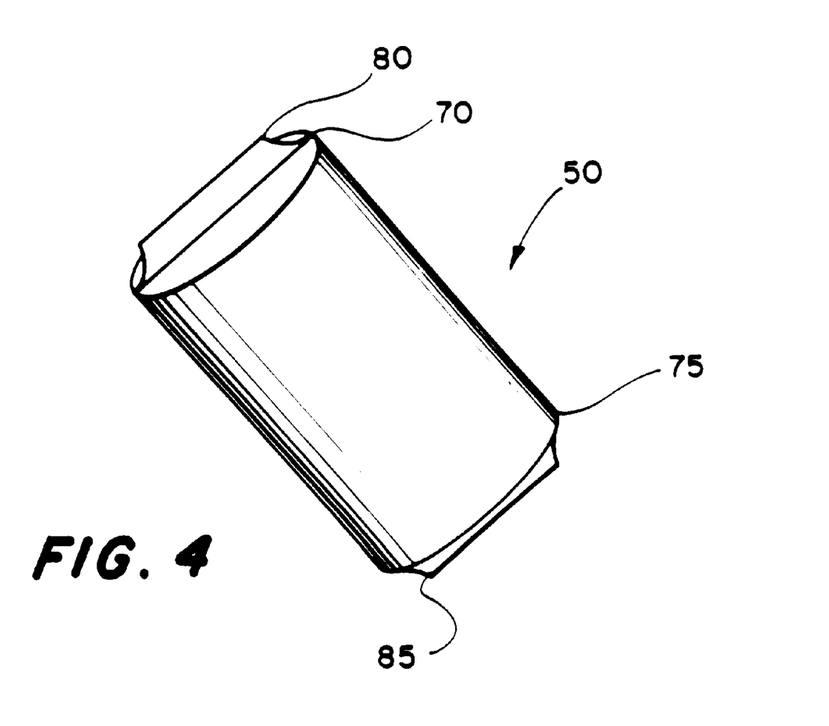
FIG. 4 is a perspective view of the capacitor element of FIG. 3 having extended foil edges.

Referring also to FIG. 4, after the sheets are wound, the element 50 is flattened. Then, first end 70 is crushed to form a first extended foil edge 80 and second end 75 is crushed to form a second extended foil edge 85.

Figure 5:
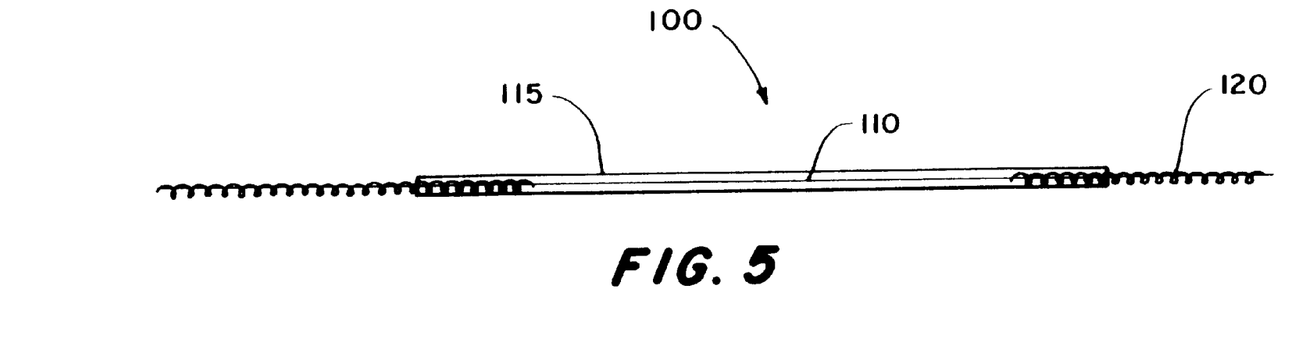
FIG. 5 is side view of a fuse assembly of the internally-fused capacitor of FIG. 1.
Figure 6:
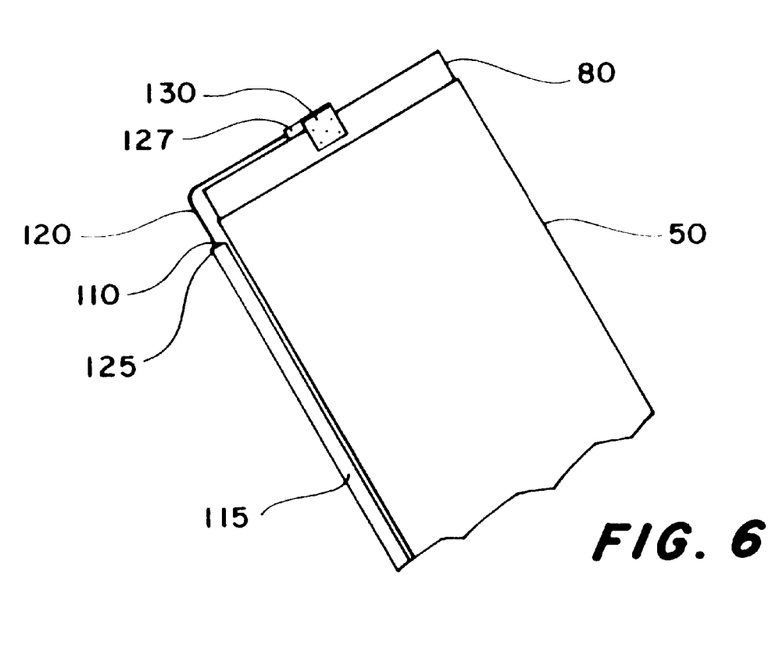
FIG. 6 is side view of an individual capacitor element of the internally-fused capacitor of FIG. 1.

Referring again to FIG. 1, the internally-fused capacitor 5 includes individual fuses 55 positioned on fuse cards 105. Referring also to FIGS. 5 and 6, each fuse 55 includes a fuse wire 110 passing through a fuse tube 115. The fuse tube 115 is made from a polymer, such as silicone rubber. A fuse leader 120 extends from a first end 125 of the fuse tube 115 and is crimped in a barrel connector 127 of a crimp plate 130 to the first extended foil edge 80 of a capacitor element 50.

An opposite end 135 of the fuse wire 110 extends from a second end 140 of the fuse tube 115. Opposite ends 135 of the fuse wires 110 for all fuses on a first fuse card are stranded together to form common node 35. Node 35 is connected to a first end 145 of a jumper lead 150 and a first discharge resistor 155 by a barrel connector 160. A second end 165 of jumper lead 150 is connected to a second discharge resistor 175 and through a second barrel connector 178 to second node 40. The second node 40 is formed by stranding together the opposite ends 135 of the fuse wires 110 for all fuses on a second card.

Third node 45 is formed by stranding together the opposite end 135 of the fuse wires 110 for all fuses on a third card. The third node 45 is connected to a discharge resistor 185 and a second jumper lead 187 with a third barrel connector 189. Jumper lead 187 is connected at its opposite end to individual second extended foil edge 85. The connection between jumper lead 187 and individual second extended foil edge 85 is made using a plate that is mechanically compressed around edge 85 to form a solderless electrical connection.

Figure 7:
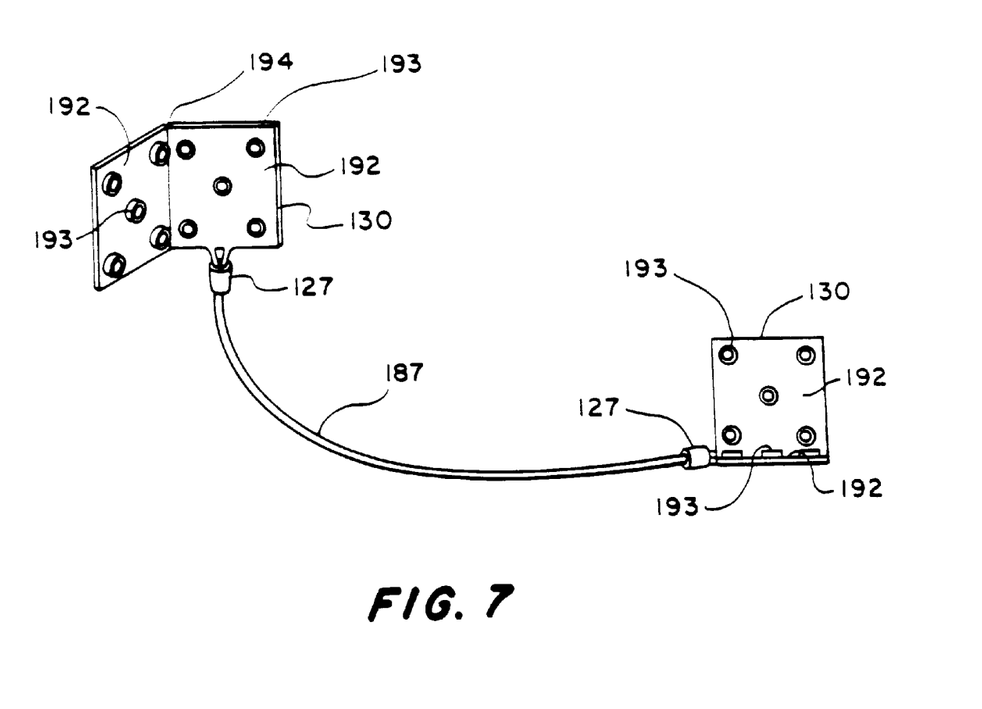
FIGS. 7 and 8 are perspective views of crimp plates connected to leads by barrel connectors.
Figure 8:
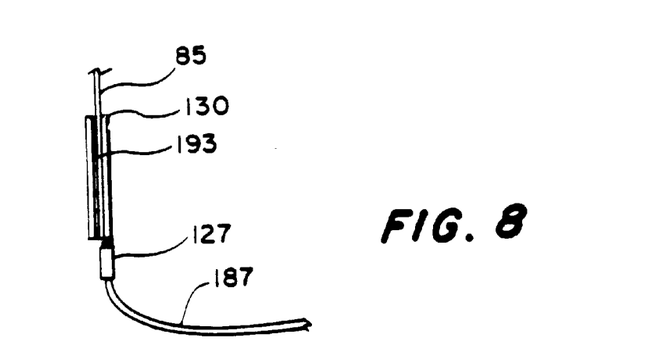
Figure 9:
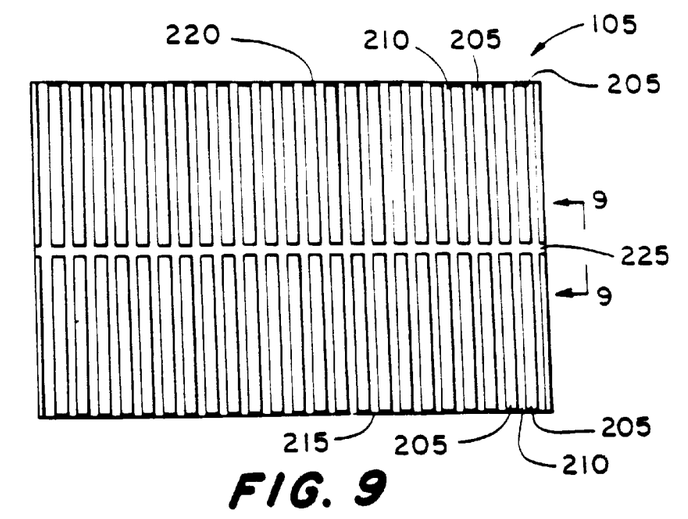
FIGS. 9–12 are various views of a fuse card of the internally-fused capacitor of FIG. 1.
Figure 10:
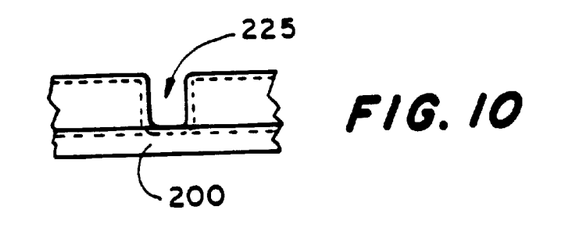
Figure 11:
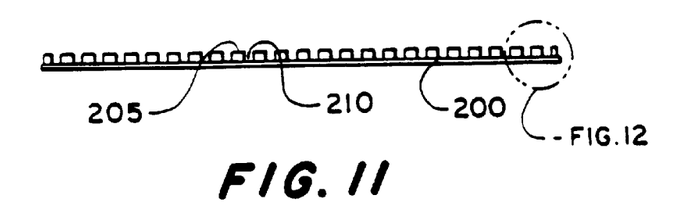
Figure 12:
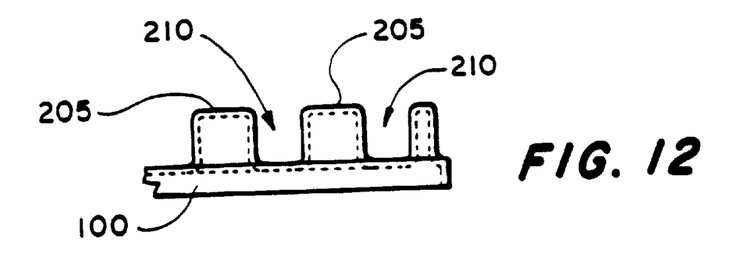

Referring also to FIGS. 7 and 8, jumper lead 187 is compressed at node 85 in barrel connector 127, which is mounted on a crimp plate 130. The crimp plate 130 has a pair of faces 192 with generally round protrusions 193. The faces 192 are joined at an axis 194 and can be pushed together such that the faces 192 are adjacent in parallel planes. As shown in FIG. 8, a foil edge, such as foil edge 85, may be placed between the faces 192 and the faces may be compressed against it. The protrusions 193 provide a firm attachment of the plate 130 to the foil edge 85.

Each of terminal leads 20, 22 of the capacitor 5 is connected to individual extended foil edges 85 located at opposite ends of the internally-fused capacitor 5. These connections are made using crimp plates 130 that are mechanically compressed around foil edge 85 and compressed with barrel connectors 127 to jumper leads 187.

Referring to FIGS. 9–12, the fuse card 105 includes a base 200 and barriers 205 separating channels 210. The barriers 205 protrude from the base 200 and define the channels 210. The spacing between the barriers is selected to secure individual fuse assemblies 100 in the channels 210. The fuse assemblies 100 are positioned in the channels 210 such that the fuse leaders 120 extend from first ends 215 of the channels 210 and opposite ends 135 extend from second ends 220 of the channels. As illustrated in greater detail in FIG. 9, a second channel 225 is perpendicular to the channels 210 and passes across a length of the fuse card 105.

The fuse card 105 is made of a material, such as polypropylene, that provides mechanical strength to prevent damage to adjacent fuse assemblies 100 that can occur if a element fails. Although fuse card 105 contains approximately 24 channels 210, it may be modified to contain more or less channels 210 depending upon the design of the capacitor in which it will be inserted. By providing fuse cards with various numbers of channels 210, assembly of the capacitor may be based on a modular approach, in which the fuse assemblies 100 are placed in a specific fuse card 105 sized for a particular application. The fuse card 105 may then be transported to a proper location on the manufacturing assembly line to be incorporated into the capacitor.

Figure 13:
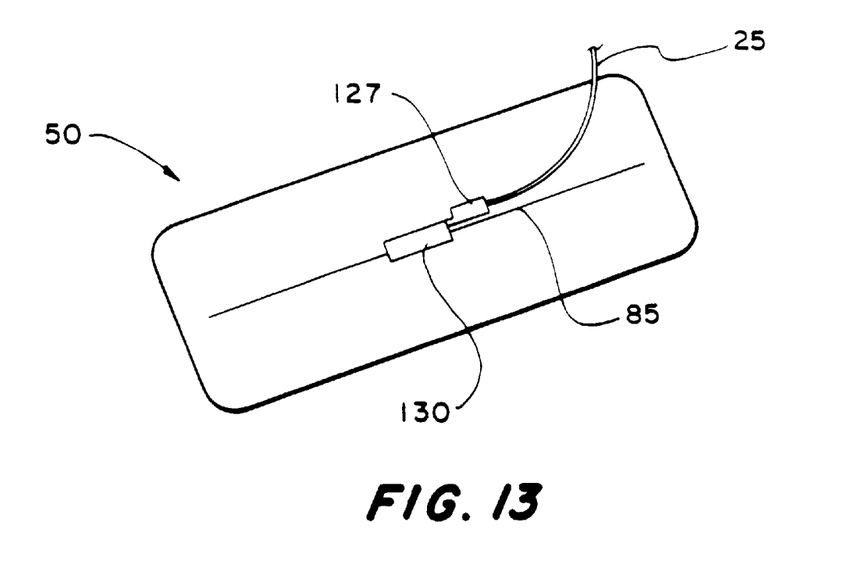
FIG. 13 is a top view of a portion of an internally-fused capacitor having mechanically-crimped connections.

Referring to FIG. 13, internally-fused capacitor 5 includes a terminal wire 25 that is connected to a capacitor element 40 at extended foil edge 85. The connection between the terminal wire 25 and extended foil edge 85 is made by crimping the wire in barrel connector 127, placing opposite faces 192 on opposite sides of edge 85 such that axis 194 rests against edge 85, and mechanically crimping the faces around the edge to form a solderless electrical connection. The internally-fused capacitor 5 may include many capacitor modules 10 and capacitor elements 50, although there will typically only be two terminal wires and terminals, 25, 27 and 20, 22 respectively.

Figure 14:
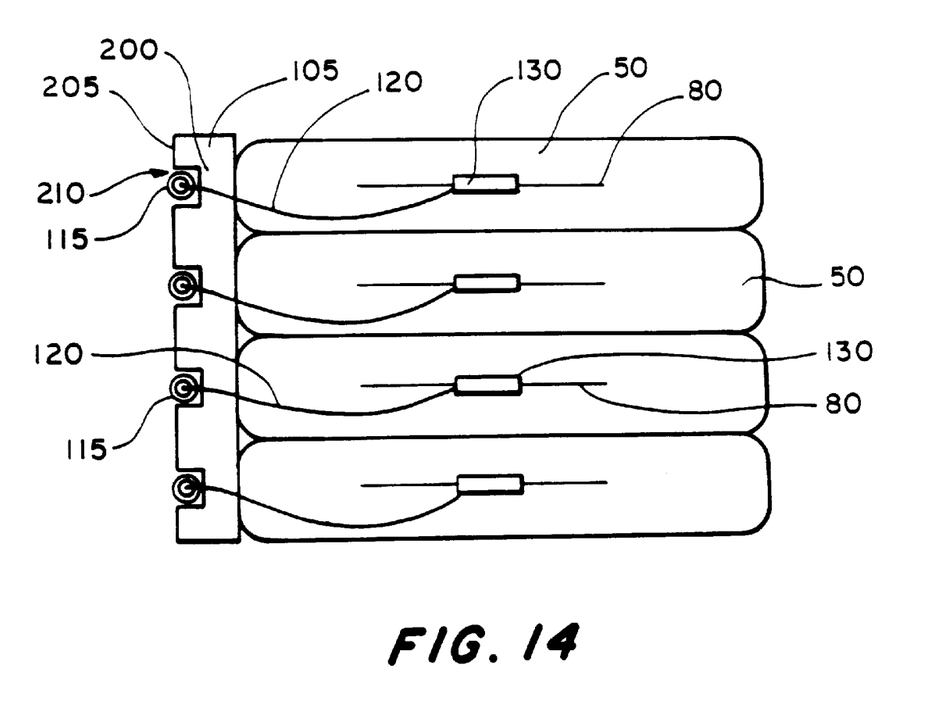
FIG. 14 is a top view of an internally-fused capacitor having multiple capacitor elements with mechanically-crimped connections and a fuse card.

Referring to FIG. 14, in an assembled capacitor 5 the fuse card 105 is placed adjacent to the elements 50 such that the base 200 is positioned between the elements 50 and the channels 210. The fuse leaders 120 are crimped with crimp plates 130 to first extended foil edges 80 to form a solderless electrical connection. The fuse card 105 and elements 50 are placed in a capacitor housing 15 and a vacuum is applied to withdraw moisture before impregnating the elements 50 and fuse card 105 with a dielectric fluid.

Other embodiments are within the scope of the claims. For example, capacitor modules 10 may vary in number within the internally-fused capacitor 5. In addition, capacitor elements 50 also may be arranged in parallel and vary in number within the design.

What is claimed is:

1. An internally-fused capacitor comprising:
   a capacitor housing;
   at least one capacitor element positioned in the housing and having a first extended foil edge; and
   at least one fuse assembly positioned in the housing and comprising a fuse wire connected to the first extended foil edge by a crimped connection.

2. The internally-fused capacitor of claim 1, wherein the crimped connection comprises a mechanical crimp between a crimp plate having a pair of faces and the first extended foil edge, such that the faces are compressed against the extended foil edge.

3. The internally-fused capacitor of claim 2, wherein the crimped connection further comprises a mechanical crimp between the fuse wire and a barrel connector mounted to the crimp plate.

4. The internally-fused capacitor of claim 1, further comprising a first terminal wire connected to a second extended foil edge of the capacitor element by a crimped connection, wherein the terminal wire is connected at an opposite end to a terminal.

5. The internally-fused capacitor of claim 4, wherein the crimped connection comprises a mechanical crimp connection between a crimp plate having a pair of faces and the second extended foil edge, such that the faces are compressed against the second extended foil edge.

6. The internally-fused capacitor of claim 5, wherein the crimped connection further comprises a mechanical crimp between the terminal wire and a barrel connector mounted to the crimp plate.

7. The internally-fused capacitor of claim 1, further comprising a fuse tube, into which the fuse wire is disposed, and at least one fuse card comprising a base with at least two barriers protruding from the base and defining a channel, wherein the fuse card is positioned adjacent to the capacitor element, the fuse card is positioned in the housing, and the fuse tube is positioned in the channel.

8. The internally-fused capacitor of claim 1, further comprising at least one capacitor module positioned in the housing, wherein the capacitor module comprises multiple capacitor elements.

9. An internally-fused capacitor comprising:
   a capacitor housing;
   at least one capacitor module positioned in the housing and comprising capacitor elements, wherein each capacitor element includes a first extended foil edge on a first end and a second extended foil edge on a second end; and
   at least one fuse assembly positioned in the housing and comprising a fuse wire disposed in a fuse tube, the fuse wire having a first end connected to the first extended foil edge.

10. The internally-fused capacitor of claim 9, further comprising at least one fuse card positioned in the housing and comprising a base with barriers protruding from the base and defining channels, the fuse assembly positioned in the channel.

11. The internally-fused capacitor of claim 9, further comprising a crimped connection between a crimp plate having a pair of faces and the first extended foil edge, such that the faces are compressed against the first extended foil edge.

12. The internally-fused capacitor of claim 11, wherein the crimped connection further comprises a mechanical crimp between the fuse wire and a barrel connector mounted to the crimp plate.

13. The internally-fused capacitor of claim 9, further comprising a terminal extending from the housing and a terminal wire connected between the terminal and the second extended foil edge of a capacitor element by a crimped connection.

14. The internally-fused capacitor of claim 13, wherein a crimped connection comprises a mechanical crimp between a crimp plate having a pair of faces and the second extended foil edge, such that the faces are compressed against the second extended foil edge.

15. The internally-fused capacitor of claim 9, further comprising:
   a second capacitor module comprising capacitor elements, wherein each capacitor element includes at least one extended foil edge; and
   fuse assemblies positioned in the housing,
   wherein each fuse wire is connected at a first end to the first extended foil edges by a crimped connection.

16. The internally-fused capacitor of claim 15, further comprising first and second fuse cards, each fuse card comprising a base with barriers protruding from the base and defining channels, wherein each fuse assembly is disposed within a channel.

17. The internally-fused capacitor of claim 16, further comprising a jumper lead connected at a first end of the jumper lead to one first extended foil edge of the first capacitor module and at a second end of the jumper lead to a fuse wire node on the second capacitor module.

18. The internally-fused capacitor of claim 16, further comprising a jumper lead connected at a first end of the jumper lead to a first fuse wire node of the first capacitor module and at a second end of the jumper lead to a second fuse wire node of the second capacitor module, wherein the first fuse wire node comprises an electrical connection through fuses to the first extended foil edges of the first capacitor module and the second fuse wire node comprises an electrical connection through fuses to the second extended foil edges of the second capacitor module.

19. The internally-fused capacitor of claim 16, wherein the fuse cards comprise a dielectric insulating material.

20. The internally-fused capacitor of claim 19, wherein the fuse card comprises polypropylene.

21. The internally-fused capacitor of claim 9, wherein the fuse tube comprises an insulating material.

22. The internally fused capacitor of claim 21, wherein the fuse tube comprises silicone rubber.

23. A method of making an internally-fused capacitor, the method comprising:
   providing a capacitor housing;
   providing at least one capacitor module comprising capacitor elements, wherein each capacitor element includes a first extended foil edge on a first end and a second extended foil edge on a second end; and
   connecting a first end of the fuse wire to the first extended foil edge by a crimped connection.

24. The method of claim 23, wherein connecting by making the crimped connection comprises mechanically crimping a crimp plate having a pair of faces against the first extended foil edge, such that the faces are compressed against the first extended foil edge.

25. The method of claim 23, wherein connecting by making the crimped connection further comprises making a mechanical crimp between the fuse wire and a barrel connector mounted to the crimp plate.

26. The method of claim 23, further comprising a first terminal wire connected to a second extended foil edge of the capacitor element by a crimped connection, wherein the terminal wire is connected at an opposite end to a terminal.

27. The method of claim 26, wherein connecting by making the crimped connection comprises mechanically crimping a crimp plate having a pair of faces against the second extended foil edge, such that the faces are compressed against the first extended foil edge.

28. The internally-fused capacitor of claim 1, wherein the crimped connection comprises a connector having a first end connected to a first end of the fuse wire and a second end connected to the first extended foil edge.

29. The internally-fused capacitor of claim 9, wherein the fuse wire is connected to the first extended foil edge by a crimped connection comprising a connector having a first end connected to the first end of the fuse wire and a second end connected to the first extended foil edge.

30. The method of claim 23, wherein the crimped connection comprises a connector having a first end connected to the first end of the fuse wire and a second end connected to the first extended foil edge.

* * * * *